June 10, 1947. W. P. LEAR 2,421,949
CENTRIFUGAL BRAKE AND CLUTCH UNIT
Filed June 20, 1945
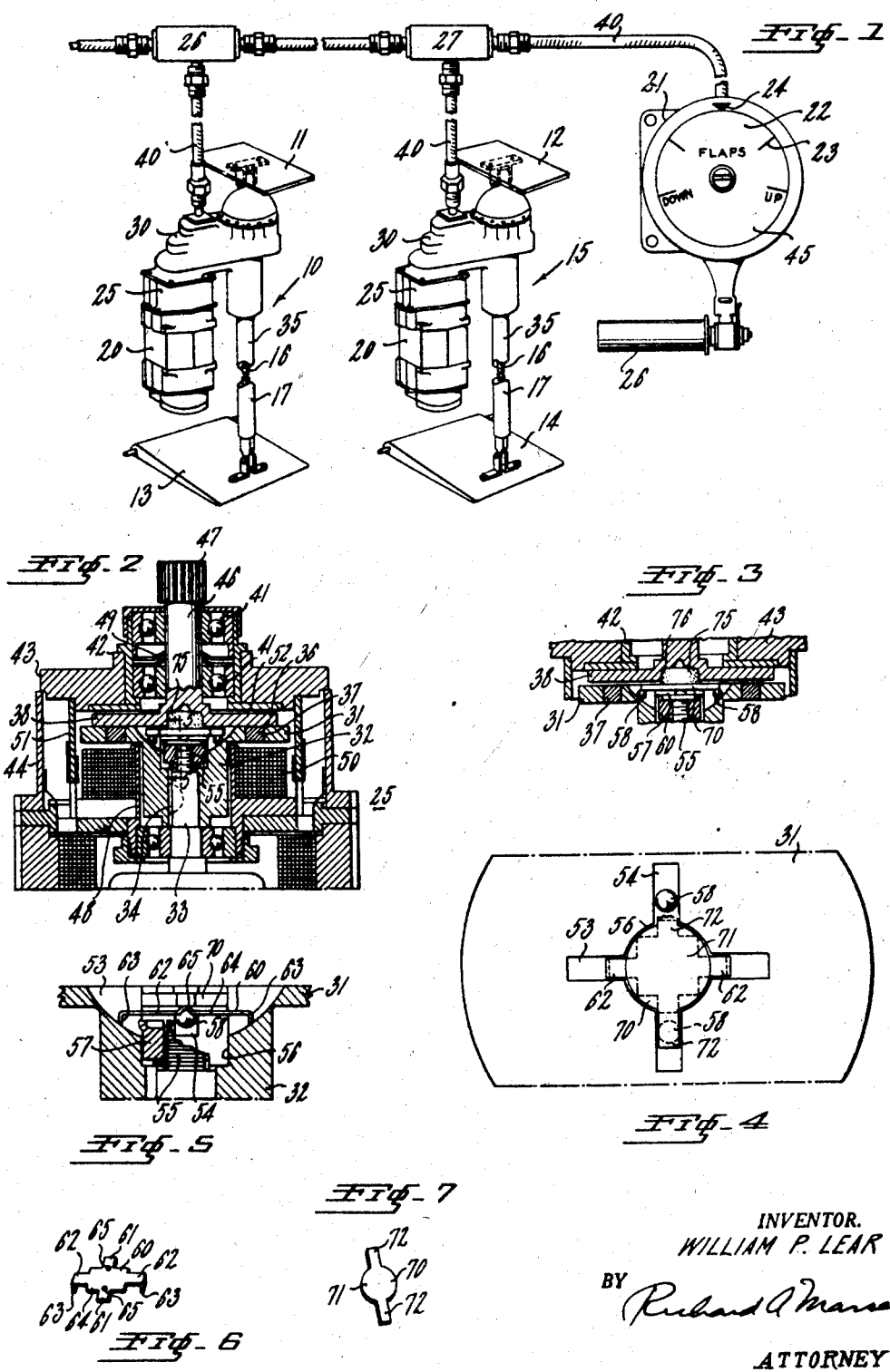
INVENTOR.
WILLIAM P. LEAR
BY
ATTORNEY Patented June 10, 1947

2,421,949

UNITED STATES PATENT OFFICE 2,421,949

CENTRIFUGAL BRAKE AND CLUTCH UNIT

William P. Lear, North Hollywood, Calif., assignor, by mesne assignments, to Lear, Incorporated, Grand Rapids, Mich., a corporation of Illinois Application June 20, 1945, Serial No. 600,485

20 Claims. (Cl. 192—18)

1

This invention relates to power driven systems, and more particularly to a novel electromagnetic clutch and centrifugal brake unit.

The invention is useful in power drive means for controlling the position of movable components of an aircraft, such as wing flaps, landing gear, etc. Aboard the larger modern aircraft, such components are usually power actuated, and the positions thereof are remotely controlled from a position adjacent the pilot. Individual power driven actuators are generally provided for each component. To provide for operation of any component in the event its power drive means becomes disabled, the power drive means for groups of the components may be interconnected mechanically as disclosed in my copending application Serial No. 490,136, filed June 9, 1943, for "Multiple actuator system," assigned to the same assignee as the present case; and as will be described hereinafter.

An effective power drive means for positioning aircraft components includes a relatively small high speed electric motor driving an actuator through an electromagnetic clutch and brake unit of the type described and claimed in my Patent No. 2,267,114, issued December 23, 1941, for "Electromagnetic clutch." The clutch and brake unit is effective, upon energization of the motor, to connect the same to the actuator, and, upon deenergization of the motor, to disconnect the motor from the actuator and substantially instantaneously arrest motion of the latter. The braking action is provided by a resilient element, such as a spring, normally biasing the clutch driven element into engagement with a fixed braking surface. Thereby, upon deenergization of the clutch winding, which is usually connected in electric circuit relation with the motor, the spring snaps the driven disk into engagement with the brake surface to instantly stop motion of the actuator connected thereof.

The above described arrangement has been found very effective in service and insures accurate positioning of movable components powered thereby. However, when a group of such actuators are interconnected so that the movable components driven thereby may be driven by remaining power units in the event of disablement of one power unit, the brake of the disabled unit would impose a large "dead" load on the remaining power units, and render such interconnection impractical.

This action may be overcome by omitting the brake from the clutch. However, in such event, upon deenergization of the motor, the actuator and the movable component are immediately disconnected from the motor, and there would be no accuracy of control since the actuator and the movable component would continue to move and overshoot its desired position.

In my copending joint application Serial No. 552,442, filed September 2, 1944, for "Electromagnetic clutch and centrifugal brake," there is disclosed a driving unit including a temporary brake engaged, during deceleration of the armature, by centrifugally operable means. When the armature has come substantially to a stop, the brake is released. Thereby, the actuator may be back driven from the driving mechanisms and other actuators in the event of inoperativeness of the motor, or may be manually back driven. The present invention relates to an improved form of temporary brake of such general type, and includes means for insuring effective operation of the brake irrespective of the position of the motor armature.

It is accordingly among the objects of this invention to provide a multiple actuator system for a plurality of mechanically interconnected movable components having individual drive means that include a novel electromagnetic clutch and brake unit; to provide such a system with each power drive means including a novel clutch and brake unit effective, upon energization of the drive means to connect the same to an actuator, and upon deenergization of the drive means, to automatically disconnect the same from the actuator and to instantly arrest motion of the actuator during the period when the speed of the drive means remains above a predetermined value; to provide a novel electromagnetic clutch and brake unit including a driving member, a driven member, a magnetic means for effecting frictional coaction of said members, a fixed braking surface, and speed responsive means effective to bias the driven member into engagement with the braking surface upon deenergization of the magnetic means and while the speed of the driving member remains above a preselected value; to provide such a unit including improved means for maintaining the brake operating mechanism in operative relation irrespective of the orientation of the motor armature; and to provide a simple, reliable and novel electromagnetic clutch including speed responsive braking means incorporated therein.

These and other objects, advantages and features of the present invention will be apparent from the following description and the accompanying drawing.

In the drawing:

Fig. 1 is a perspective view of a multiple actuator system embodying the invention.

Fig. 2 is an enlarged cross-sectional view of a magnetic clutch and brake unit in accordance with the invention.

Fig. 3 is a cross-sectional view of a portion of Fig. 2 showing the brake in the engaged position.

Fig. 4 is an enlarged partial plan view of the clutch driving disk and brake operating mechanism.

Fig. 5 is an enlarged cross-sectional view on the line 5—5 of Fig. 2.

Figs. 6 and 7 are perspective views illustrating components of the brake operating mechanisms.

Referring to Fig. 1 of the drawing, actuator units 10 and 15 are illustrated as connected at one end to relatively fixed supports 11 and 12. At their opposite ends, units 10 and 15 are connected to movable members 13 and 14. In the illustrated embodiment, fixed supports 11 and 12 may represent a fixed portion or frame of an airplane; and movable members 13 and 14 wing flaps pivoted to a fixed portion of the wing structure. Fig. 1 illustrates how the apparatus of the invention may be used for actuating a pair of wing flaps. In the event that several pairs of wing flaps are to be actuated, more actuator units similar to 10 and 15 may be added to the system.

Motor actuator units 10 and 15 may be generally of the type described and claimed in the referred to application Serial No. 483,515. Each linear actuator unit comprises a unitary assembly including an electric motor 20, and electromagnetic clutch and brake unit 25, a gear housing 30, and a jack screw 35. Clutch and brake unit 25 is connected in electric series or parallel circuit relation with its associated motor 20. When motor 20 is energized, clutch 25 is energized to connect the motor to associated reduction gearing in gear housing 30. Upon deenergization of motor 20, clutch 25 disconnects the motor from the gearing in housing 30 and, as will be described more fully hereinafter, effecting an instantaneous braking action on the gearing during the period while the rotational energy of the motor armature is being dissipated. When the motor armature has nearly come to a stop, the braking action on gearing 30 is no longer effective.

Each jack screw 35 comprises a screw 16 and a sleeve member 17 having internal threads engaging those of the screw. Screw 16 and sleeve 17 are relatively rotatable with respect to each other; one being relatively fixed against rotation, and the other connected to be rotated by reduction gearing in housing 30. Thereby, motor 20, when energized, will extend and retract its associated jack screw 35 through an engaged clutch in unit 25 and the gearing in housing 30.

All of the actuators 10 and 15 are interconnected by suitable driving mechanism such as flexible shafting indicated generally at 40. While the driving means has been illustrated as flexible shafting, such illustration is to be considered exemplary. Units 10 and 15 may be interconnected by gearing, rigid shafting, or any other type of mechanical driving connection. Due to such interconnection, in the event of failure of one or more of the motors 20, the actuators driven thereby may still be driven and positioned by the remaining motors through the medium of the shafting 40. In the event of failure of all of the motors 20, a manual drive means 45 is provided to override and operate the actuators 10 and 15 through shafting 40. Electromagnetic clutch and brake units 25 are in electrical circuit arrangement with the motors 20. Thereby, in the event of failure of one motor 20, its clutch and brake unit 25 is deenergized, disconnecting the motor from the actuator, the braking action of unit 25 being removed from the actuator as will be described. The action removes the idle motor load.

Manual drive means 45 may be of the type described and claimed in my co-pending application Serial No. 504,259, for "Remote control and indicator system," assigned to the same assignee as this case. It includes a housing 21 having a face plate 22 on which are indicia 23 cooperating with a pointer 24. Gearing in housing 21 is connected to flexible shafting 40 and also to indicator 24. As shafting 40 is mechanically connected to units 10 and 15, indicator 24 moves in synchronism with the movement of wing flaps 13 and 14, indicating their relative position. For manual operation, a handle 26 is provided for unit 45. In the position shown, handle 26 is disconnected from the gearing in housing 21, but may be connected therewith by being swung to a position at right angles to the illustrated position, all as described in the said application.

The several sections of flexible shafting 40 are interconnected through gear boxes 26 and 27 containing suitable gearing for transmitting motion either in a straight line or at an angle from one section of the shafting to another section thereof. As many gear boxes may be provided as are necessary to properly interconnect the number of actuator units which it is desired to operate in mechanical synchronism with each other.

An important feature of the present invention relates to the electromagnetic clutch and brake unit 25. Referring to Figs. 2 through 7, unit 25 comprises a driving clutch member 31 having a hub 32 secured on motor armature shaft 33 by a key 34. Member 31 includes a clutching surface 36 of magnetic material in which is set an annular member 37 of non-magnetic material. Clutching surface 36 is adapted to have frictional and magnetic coaction with a clutch and brake disk 38, of magnetic material, forming part of a driven clutch member. Driven clutch member 38 is mounted in bearings 41, 41 in sleeve member 42 secured in end plate 43 of clutch housing 44. Driven clutch member 38 includes a driven shaft 46 provided with a pinion 47 which engages with gearing contained in gear housing 30 of units 10 and 15. Clutch driven member 38 is axially displaceable so that it may engage either driving surface 36 or braking surface 52. Relatively light springs 49 normally tend to bias driven member 38 a slight amount out of engagement with driving member 31 but not into engagement with brake surface 52.

To provide magnetic flux for actuating clutch unit 25, a tubular member 48 is mounted in the clutch housing around hub 32. A coil winding 50 is mounted on member 48 and an annular member 51 of magnetic material surrounds member 48 and coil 50. Hub 32 is likewise of magnetic material. Coil 50 is connected in series or parallel electric circuit relation with motor 20, so that, upon energization of motor 20, coil 50 will create a magnetic flux action between driving member 31, driven member 38, annular member 51 and tubular member 48. Member 36 of non-magnetic material is provided to direct the magnetic forces to provide an effective magnetic attraction of the two clutch members to each other as described in my Patent No. 2,267,114 referred to above.

Braking surface 52 is mounted in end plate 43 and adapted to be engaged by the back surface of driven clutch member 38. Such engagement is effected instantaneously upon deenergization of motor 20 and winding 50 in the following manner. The clutch surface 36 of driving member 31 is provided with a pair of perpendicularly related arcuate recesses 53 and 54, extending also into hub member 32. Armature shaft 33 is provided with a reduced threaded extension 55 extending into a central circular recess 56 in the hub 32 of driving member 31. A nut 57 is secured to extension 55 to assist in retaining driving member 31 on armature shaft 32.

A pair of centrifugal members such as balls, 58, 58 are arranged in slot 54. A light spring member 60, shown more clearly in Fig. 6, is disposed in slot 53. Member 60 is substantially cruciform, having arms 61 and 62. Arms 62 are formed with downturned ends 63, and ends 63 engage the bottom of recess 53. The central section 64 of member 60 is provided with pressed out abutments 65, 65. Arms 61 extend parallel to slot 54.

A thrust or bearing member 70, shown more particularly in Fig. 7, overlaps member 60, resting on abutments 65. Member 70 comprises a central circular section 71 having projecting arms 72, 72. Arms 72 are disposed in slot 54 and engage balls 58 in the slot.

A carbon bearing 75 is disposed in a central recess 76 in the clutching surface of driven member 38. Bearing 75 continually engages the circular bearing portion 71 of member 70. Under certain conditions, to be presently described, balls 58 move radially and axially outwardly in slot 54 forcing member 70 outwardly, which, due to its engagement with bearing 75, moves driven disk 38 into engagement with braking surface 52 to substantially instantly stop motion of pinion 47.

When motor 20 is energized, winding 50 is simultaneously energized creating the above described magnetic flux circuit in clutch unit 25. Clutch member 38 is immediately engaged frictionally with drive clutching surface 36 to establish a driving connection between armature shaft 38 and output pinion 47. The magnetic attraction between clutch driving and driven members is sufficient to overcome the centrifugal force created in balls 58 as the clutch is driven. However, when motor 20 is deenergized, the magnetic flux circuit is collapsed releasing the mechanical attraction between clutch members 31 and 38. Balls 58, with a stored centrifugal force, then fly outwardly along arcuate slot 54 to urge member 70 outwardly to snap driven disk 38 into engagement with braking surface 52. This substantially instantaneously arrests motion of pinion 47 and the output load connected thereto.

Due to centrifugal force, balls 58 maintain driven clutch member 38 in engagement with brake surface 52 during the period while the high speed rotational energy of armature shaft 33 is being dissipated. When the speed drops below a predetermined value, the centrifugal force acting on balls 58 is reduced to the point where these balls drop back radially inwardly along slot 54. Driven clutch member 38 is thus released from engagement with braking surface 52, so that pinion 47 of the gearing connected thereto may rotate free of braking surface 52. In the braking interval just described, the slower moving output load represented by actuator 35 and movable component 14 has been arrested. Thus, its positioning is accurately controllable. Also, due to the mechanical interconnections 40 through gearing units 30, the components 14 all are held in such arrested position. In any subsequent cycle, should one of the motor drives 20 or clutch units 25 fail, the disconnection of gearing 30 and actuator 35 through the automatic centrifugal brake of the invention permits overriding of the local motor drive through shafting 40 or its equivalent by the remaining motors or by manual drive 45.

The described invention provides an effectively operable automatic brake. The spring 60 has no direct connection with balls 58 except to prevent them from getting over the lip of nut 57. Improved drive unit 25 has definite advantages as a centrifugally operated automatic brake. The balls 58 do not directly engage driven disk 38, and thus maintain the full rotational speed of the driving disk 31 instead of the average speed of the two clutch disks. Therefore, during a braking action, the braking force is maintained over a longer period of time and the brake will only drop out when the motor armature has nearly ceased to coast. Another advantage is that the balls have to move only a small distance to operate the centrifugal brake, and do not rotate. Accurately machined surfaces are therefore not necessary and thus decrease the cost of manufacturing the driving unit. Additionally, the balls have no tendency to heat up.

The relatively light springs 49 assist in normally maintaining driven disk 38 slightly out of engagement with drive disk 31. This tends to reduce any wear on carbon bearing 75 when the unit is being back driven. This action supplements that of spring 60 having dimples 65 engaging thrust plate 70.

While specific embodiment of the invention has been shown and described in detail to illustrate the application of the principles thereof, it will be understood that the invention may be otherwise embodied without departing from such principles.

What is claimed is:

1. A clutch and brake unit comprising, in combination, a driving member; a driven member coactable with said driving member; a brake surface arranged adjacent said driven member; resilient means normally biasing said members out of engagement; speed responsive means effective during rotation of said driving member above a predetermined angular velocity to exert a separating force on said members; and other means effective, when activated, to overcome such separating force and said resilient means to establish frictional engagement between said members; said speed responsive means, upon deactivation of said other means, engaging said driven member with said brake surface to arrest rotation of said driven member during rotation of said driving member above the predetermined angular velocity.

2. A clutch and brake unit comprising, in combination, a driving member; a driven member coactable with said driving member; a brake surface arranged adjacent said driven member; resilient means normally biasing said members out of engagement; speed responsive means effective during rotation of said driving member above a predetermined angular velocity to exert a separating force on said members; and electromagnetic means effective, when activated, to overcome such separating force and said resilient means to establish frictional engagement between said members; said speed responsive means, upon deactivation of said electromagnetic means, engaging said driven member with said brake surface to arrest rotation of said driven member during rotation of said driving member above the predetermined angular velocity.

3. A clutch and brake unit comprising, in combination, a rotatable driving disk having a clutching surface; a rotatable driven disk having a clutching surface frictionally coactable with the driving disk clutching surface; a brake surface arranged adjacent said driven disk; resilient means normally biasing said clutching surfaces out of engagement; speed responsive means effective during rotation of said driving disk above a predetermined angular velocity to exert a separating force on said clutching surfaces; and other means effective, when activated, to overcome such separating force and said resilient means to establish frictional engagement between said disks; said speed responsive means, upon deactivation of said other means, engaging said driven member with said brake surface to arrest rotation of said driven member during rotation of said driving member above the predetermined angular velocity.

4. A clutch and brake unit comprising, in combination, a rotatable driving disk having a clutching surface; a rotatable driven disk having a clutching surface frictionally coactable with the driving disk clutching surface; a brake surface arranged adjacent said driven disk; a bearing mounted centrally of said driven disk clutching surface; resilient means engaging said bearing to normally bias said clutching surfaces out of engagement; speed responsive means effective during rotation of said driving disk above a predetermined angular velocity to exert a separating force on said clutching surfaces; and other means effective, when activated, to overcome such separating force and said resilient means to establish frictional engagement between said disks; said speed responsive means, upon deactivation of said other means, engaging said driven member with said brake surface to arrest rotation of said driven member during rotation of said driving member above the predetermined angular velocity.

5. A clutch and brake unit comprising, in combination, a rotatable driving disk having a clutching surface; a rotatable driven disk having a clutching surface frictionally coactable with the driving disk clutching surface; a brake surface arranged adjacent said driven disk; a bearing centrally of said driven disk clutching surface; a bearing member mounted on said driving disk clutching surface and engaging said bearing; resilient means engaging said bearing member to normally bias said clutching surfaces out of engagement; speed responsive means effective during rotation of said driving disk above a predetermined angular velocity to exert a separating force on said clutching surfaces; and other means effective, when activated, to overcome such separating force and said resilient means to establish frictional engagement between said disks; said speed responsive means, upon deactivation of said other means, engaging said driven member with said brake surface to arrest rotation of said driven member during rotation of said driving member above the predetermined angular velocity.

6. A clutch and brake unit comprising, in combination, a rotatable driving disk having a clutching surface; a rotatable driven disk having a clutching surface frictionally coactable with the driving disk clutching surface; a brake surface arranged adjacent said driven disk; a bearing centrally of said driven disk clutching surface; a bearing member mounted on said driving disk clutching surface and engaging said bearing; resilient means engaging said bearing member to normally bias said clutching surfaces out of engagement; speed responsive means mounted on said driving disk effective during rotation of said driving disk above a predetermined angular velocity to engage said bearing member and exert a separating force on said clutching surfaces; and other means effective, when activated, to overcome such separating force and said resilient means to establish frictional engagement between said disks; said speed responsive means, upon deactivation of said other means, engaging said driven member with said brake surface to arrest rotation of said driven member during rotation of said driving member above the predetermined angular velocity.

7. A clutch and brake unit comprising, in combination, a rotatable driving disk of magnetic material having a clutching surface; a rotatable driven disk of magnetic material having a clutching surface magnetically and frictionally coactable with the driving disk clutching surface; a brake surface arranged adjacent said driven disk; resilient means normally biasing said clutching surfaces out of engagement; speed responsive means effective during rotation of said driving disk above a predetermined angular velocity to exert a separating force on said clutching surfaces; and magnetic flux generating means operable, when energized, to overcome such separating force and said resilient means and establish frictional engagement between said clutching surfaces; said speed responsive means, upon deenergization of said magnetic flux generating means, engaging said driven disk with said brake surface to arrest rotation of said driven disk during rotation of said driving disk above the predetermined angular velocity.

8. A clutch and brake unit comprising, in combination, a rotatable driving disk of magnetic material having a clutching surface; a rotatable driven disk of magnetic material having a clutching surface magnetically and frictionally coactable with the driving disk clutching surface; a brake surface arranged adjacent said driven disk; a bearing member mounted centrally of said driven disk clutching surface; resilient means engaging said bearing member to normally bias said clutching surfaces out of engagement; speed responsive means effective during rotation of said driving disk above a predetermined angular velocity to exert a separating force on said clutching surfaces; magnetic flux generating means operable, when energized, to overcome such separating force and said resilient means and establish frictional engagement between said clutching surfaces; and said speed responsive means, upon deenergization of said magnetic flux generating means, engaging said driven disk with said brake surface to arrest rotation of said driven disk during rotation of said driving disk above the predetermined angular velocity.

9. A clutch and brake unit comprising, in combination, a rotatable driving disk of magnetic material having a clutching surface; a rotatable driven disk of magnetic material having a clutching surface magnetically and frictionally coactable with the driving disk clutching surface; a brake surface arranged adjacent said driven disk; a bearing mounted centrally of said driven disk clutching surface; a bearing member mounted on said driving disk clutching surface and engaging said bearing; resilient means engaging said bearing member to normally bias said clutching surfaces out of engagement; speed responsive means effective during rotation of said driving disk above a predetermined angular velocity to exert a separating force on said clutching surfaces; a magnetic flux generating means operable, when energized, to overcome such separating force and said resilient means and establish frictional engagement between said clutching surfaces; and said speed responsive means, upon deenergization of said magnetic flux generating means, engaging said driven disk with said brake surface to arrest rotation of said driven disk during rotation of said driving disk above the predetermined angular velocity.

10. A clutch and brake unit comprising, in combination, a rotatable driving disk of magnetic material having a clutching surface; a rotatable driven disk of magnetic material having a clutching surface magnetically and frictionally coactable with the driving disk clutching surface; a brake surface arranged adjacent said driven disk; a bearing mounted centrally of said driven disk clutching surface; a bearing member mounted on said driving disk clutching surface and engaging said bearing; resilient means engaging said bearing member to normally bias said clutching surfaces out of engagement; speed responsive means mounted on said driving disk effective during rotation of said driving disk above a predetermined angular velocity to engage said bearing member and exert a separating force on said clutching surfaces; magnetic flux generating means operable, when energized, to overcome such separating force and said resilient means and establish frictional engagement between said clutching surfaces; and said speed responsive means, upon deenergization of said magnetic flux generating means, engaging said driven disk with said brake surface to arrest rotation of said driven disk during rotation of said driving disk above the predetermined angular velocity.

11. A clutch and brake unit comprising, in combination, a rotatable driving disk having a clutching surface; a rotatable driven disk having a clutching surface frictionally coactable with the driving disk clutching surface; a brake surface arranged adjacent said driven disk; said driving disk clutching surface having a central recess and a pair of perpendicularly related arcuate slots extending diametrically through such recess; a nut disposed in said recess and securing said driving disk to a driving shaft; a spring disposed in one of said slots and normally biasing said clutching surfaces out of engagement; a pair of balls disposed in the other slot on either side of said nut and effective during rotation of said driving disk above a predetermined angular velocity to exert a separating force on said clutching surfaces; and other means effective, when activated, to overcome such separating force and said spring to establish frictional engagement between said disks; said balls, upon deactivation of said other means, moving radially and axially outwardly along said other slot to engage said driven disk with said brake surface to arrest rotation of said driven disk during rotation of said driving disk above the predetermined angular velocity.

12. A clutch and brake unit comprising, in combination, a rotatable driving disk having a clutching surface; a rotatable driven disk having a clutching surface frictionally coactable with the driving disk clutching surface; a brake surface arranged adjacent said driven disk; said driving disk clutching surface having a central recess and a pair of perpendicularly related arcuate slots extending diametrically through such recess; a nut disposed in said recess and securing said driving disk to a driving shaft; a bearing member mounted centrally of said driven disk clutching surface; a spring disposed in one of said slots and engaging said bearing member to normally bias said clutching surfaces out of engagement; a pair of balls disposed in the other slot on either side of said nut and effective during rotation of said driving disk above a predetermined angular velocity to exert a separating force on said clutching surfaces; and other means effective, when activated, to overcome such separating force and said spring to establish frictional engagement between said disks; said balls, upon deactivation of said other means, moving radially and axially outwardly along said other slot to engage said driven disk with said brake surface to arrest rotation of said driven disk during rotation of said driving disk above the predetermined angular velocity.

13. A clutch and brake unit comprising, in combination, a rotatable driving disk having a clutching surface; a rotatable driven disk having a clutching surface frictionally coactable with the driving disk clutching surface; a brake surface arranged adjacent said driven disk; said driving disk clutching surface having a central recess and a pair of perpendicularly related arcuate slots extending diametrically through such recess; a nut disposed in said recess and securing said driving disk to a driving shaft; a bearing mounted centrally of said driven disk clutching surface; a bearing member mounted on said driving disk clutching surface and engaging said bearing; a spring disposed in one of said slots and engaging said bearing member to normally bias said clutching surfaces out of engagement; a pair of balls disposed in the other slot on either side of said nut and effective during rotation of said driving disk above a predetermined angular velocity to exert a separating force on said clutching surfaces, said bearing member overlying said other slot; and other means effective, when activated, to overcome such separating force and said spring to establish frictional engagement between said disks; said balls, upon deactivation of said other means, moving radially and axially outwardly along said other slot to move said bearing member axially to engage said driven disk with said brake surface to arrest rotation of said driven disk during rotation of said driving disk above the predetermined angular velocity.

14. A clutch and brake unit comprising, in combination, a rotatable driving disk having a clutching surface; a rotatable driven disk having a clutching surface frictionally coactable with the driving disk clutching surface; a brake surface arranged adjacent said driven disk; said driving disk clutching surface having a central recess and a pair of perpendicularly related arcuate slots extending diametrically through such recess; a nut disposed in said recess and securing said driving disk to a driving shaft; a bearing mounted centrally of said driven disk clutching surface; a bearing member mounted on said driving disk clutching surface and engaging said bearing; a spring disposed in one of said slots and engaging said bearing member to normally bias said clutching surfaces out of engagement; a pair of balls disposed in the other slot on either side of said nut and effective during rotation of said driving disk above a predetermined angular velocity to exert a separating force on said clutching surfaces, said bearing member having a central portion aligned with said bearing and nut and a pair of arms overlying said other slot and the balls therein; and other means effective, when activated, to overcome such separating force and said spring to establish frictional engagement between said disks; said balls, upon deactivation of said other means, moving radially and axially outwardly along said other slot to move said bearing member axially to engage said driven disk with said brake surface to arrest rotation of said driven disk during rotation of said driving disk above the predetermined angular velocity.

15. A clutch and brake unit comprising, in combination, a rotatable driving disk having a clutching surface; a rotatable driven disk having a clutching surface frictionally coactable with the driving disk clutching surface; a brake surface arranged adjacent said driven disk; said driving disk clutching surface having a central recess and a pair of perpendicularly related arcuate slots extending diametrically through such recess; a nut disposed in said recess and securing said driving disk to a driving shaft; a bearing mounted centrally of said driven disk clutching surface; a bearing member mounted on said driving disk clutching surface and engaging said bearing; a cruciform spring having a first pair of arms having downturned ends engaged in one of said slots and a second pair of arms aligned with the other slot, said spring engaging said bearing member to normally bias said clutching surfaces out of engagement; a pair of balls disposed in the other slot on either side of said nut and effective during rotation of said driving disk above a predetermined angular velocity to exert a separating force on said clutching surfaces, said bearing member having a central portion aligned with said bearing and nut and a pair of arms overlying said other slot and the balls therein; and other means effective, when activated, to overcome such separating force and said spring to establish frictional engagement between said disks; said balls, upon deactivation of said other means, moving radially and axially outwardly along said other slot to engage said driven disk with said brake surface to arrest rotation of said driven disk during rotation of said driving disk above the predetermined angular velocity.

16. A clutch and brake unit comprising, in combination, a rotatable driving disk having a clutching surface; a rotatable driven disk having a clutching surface frictionally coactable with the driving disk clutching surface; a brake surface arranged adjacent said driven disk; said driving disk clutching surface having a central recess and a pair of perpendicularly related arcuate slots extending diametrically through such recess; a nut disposed in said recess and securing said driving disk to a driving shaft; a bearing mounted centrally of said driven disk clutching surface; a bearing member mounted on said driving disk clutching surface and engaging said bearing; a cruciform spring having a first pair of arms having downturned ends engaged in one of said slots and a second pair of arms aligned with the other slot, said spring engaging said bearing member to normally bias said clutching surfaces out of engagement; the central portion of said spring having projections engaging and spacing said bearing member from said spring; a pair of balls disposed in the other slot on either side of said nut and effective during rotation of said driving disk above a predetermined angular velocity to exert a separating force on said clutching surfaces, said bearing member having a central portion aligned with said bearing and nut and a pair of arms overlying said other slot and the balls therein; and other means effective, when activated, to overcome such separating force and said spring to establish frictional engagement between said disks; said balls, upon deactivation of said other means, moving radially and axially outwardly along said other slot to move said bearing member axially to engage said driven disk with said brake surface to arrest rotation of said driven disk during rotation of said driving disk above the predetermined angular velocity; the second pair of spring arms preventing said balls from overriding said nut.

17. A clutch and brake unit comprising, in combination, a rotatable driving disk of magnetic material having a clutching surface; a rotatable driven disk of magnetic material having a clutching surface magnetically and frictionally coactable with the driving disk clutching surface; a brake surface arranged adjacent said driven disk; said driving disk clutching surface having a central recess and a pair of perpendicularly related arcuate slots extending diametrically through such recess; a nut disposed in said recess and securing said driving disk to a driving shaft; a spring disposed in one of said slots and normally biasing said clutching surfaces out of engagement; a pair of balls disposed in the other slot on either side of said nut and effective during rotation of said driving disk above a predetermined angular velocity to exert a separating force on said clutching surfaces; a magnetic flux generating means operable, when energized, to overcome such separating force and said spring and establish frictional engagement between said clutching surfaces; said balls, upon deenergization of said flux generating means, moving radially and axially outwardly along said other slot to engage said driven disk with said brake surface to arrest rotation of said driven disk during rotation of said driving disk above the predetermined angular velocity.

18. A clutch and brake unit comprising, in combination, a rotatable driving disk of magnetic material having a clutching surface; a rotatable driven disk of magnetic material having a clutching surface magnetically and frictionally coactable with the driving disk clutching surface; a brake surface arranged adjacent said driven disk; said driving disk clutching surface having a central recess and a pair of perpendicularly related arcuate slots extending diametrically through such recess; a nut disposed in said recess and securing said driving disk to a driving shaft; a bearing member mounted centrally of said driven disk clutching surface; a spring disposed in one of said slots and engaging said bearing member to normally bias said clutching surfaces out of engagement; a pair of balls disposed in the other slot on either side of said nut and effective during rotation of said driving disk above a predetermined angular velocity to exert a separating force on said clutching surfaces; and magnetic flux generating means operable, when energized, to overcome such separating force and said spring and establish frictional engagement between said clutching surfaces; said balls, upon deenergization of said flux generating means, moving radially and axially outwardly along said other slot to move said bearing member axially to engage said driven disk with said brake surface to arrest rotation of said driven disk during rotation of said driving disk above the predetermined angular velocity.

19. A clutch and brake unit comprising, in combination, a rotatable driving disk of magnetic material having a clutching surface; a rotatable driven disk of magnetic material having a clutching surface magnetically and frictionally coactable with the driving disk clutching surface; a brake surface arranged adjacent said driven disk; said driving disk clutching surface having a central recess and a pair of perpendicularly related arcuate slots extending diametrically through such recess; a nut disposed in said recess and securing said driving disk to a driving shaft; a bearing mounted centrally of said driven disk clutching surface; a bearing member mounted on said driving disk clutching surface and engaging said bearing; a cruciform spring having a first pair of arms having downturned ends engaged in one of said slots and a second pair of arms aligned with the other slot, said spring engaging said bearing member to normally bias said clutching surfaces out of engagement; a pair of balls disposed in the other slot on either side of said nut and effective during rotation of said driving disk above a predetermined angular velocity to exert a separating force on said clutching surfaces; said bearing member having a central portion aligned with said bearing and nut and a pair of arms overlying said other slot and the balls therein; and magnetic flux generating means operable, when energized, to overcome such separating force and said spring and establish frictional engagement between said clutching surfaces; said balls, upon deenergization of said flux generating means, moving radially and axially outwardly along said other slot to move said bearing member axially to engage said driven disk with said brake surface to arrest rotation of said driven disk during rotation of said driving disk above the predetermined angular velocity.

20. A clutch and brake unit comprising, in combination, a rotatable driving disk of magnetic material having a clutching surface; a rotatable driven disk of magnetic material having a clutching surface magnetically and frictionally coactable with the driving disk clutching surface; a brake surface arranged adjacent said driven disk; said driving disk clutching surface having a central recess and a pair of perpendicularly related arcuate slots extending diametrically through such recess; a nut disposed in said recess and securing said driving disk to a driving shaft; a bearing mounted centrally of said driven disk clutching surface; a bearing member mounted on said driving disk clutching surface and engaging said bearing; a cruciform spring having a first pair of arms having downturned ends engaged in one of said slots and a second pair of arms aligned with the other slot, said spring engaging said bearing member to normally bias said clutching surfaces out of engagement; the central portion of said spring having projections engaging and spacing said bearing member from said spring; a pair of balls disposed in the other slot on either side of said nut and effective during rotation of said driving disk above a predetermined angular velocity to exert a separating force on said clutching surfaces; said bearing member having a central portion aligned with said bearing and nut and a pair of arms overlying said other slot and the balls therein; and magnetic flux generating means operable, when energized, to overcome such separating force and said spring and establish frictional engagement between said clutching surfaces; said balls upon deenergization of said flux generating means, moving radially and axially outwardly along said other slot to move said bearing member axially to engage said driven disk with said brake surface to arrest rotation of said driven disk during rotation of said driving disk above the predetermined angular velocity; the second pair of spring arms preventing said balls from overriding said nut.

WILLIAM P. LEAR.